United States Patent
Jacobs et al.

(10) Patent No.: US 7,909,483 B2
(45) Date of Patent: Mar. 22, 2011

(54) LIGHTING SYSTEM

(75) Inventors: Joseph Hendrik Anna Maria Jacobs, Eygelshoven (NL); Eberhard Waffenschmidt, Aachen (NL); Dirk Hente, Wurselen (DE); Michael Bragard, Aachen (DE); Wolfgang Otto Budde, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 274 days.

(21) Appl. No.: 12/373,781

(22) PCT Filed: May 21, 2007

(86) PCT No.: PCT/IB2007/051913
§ 371 (c)(1),
(2), (4) Date: Jan. 14, 2009

(87) PCT Pub. No.: WO2008/012702
PCT Pub. Date: Jan. 31, 2008

(65) Prior Publication Data
US 2009/0290332 A1 Nov. 26, 2009

(30) Foreign Application Priority Data
Jul. 21, 2006 (EP) .................................. 06117675

(51) Int. Cl.
*F21L 13/06* (2006.01)
*H01F 27/42* (2006.01)
(52) U.S. Cl. ......... 362/276; 362/394; 362/295; 315/276
(58) Field of Classification Search .................. 362/276, 362/183, 394, 411, 295, 802, 398, 151, 152, 362/153, 800; 315/276–278, 283–286, 504; 307/104
See application file for complete search history.

(56) References Cited

U.S. PATENT DOCUMENTS

| 5,050,846 | A | | 9/1991 | Goodman et al. | |
|---|---|---|---|---|---|
| 5,264,997 | A | * | 11/1993 | Hutchisson et al. | 362/645 |
| 5,307,250 | A | * | 4/1994 | Pearson | 362/101 |
| 5,329,716 | A | * | 7/1994 | Fite | 40/575 |

(Continued)

FOREIGN PATENT DOCUMENTS
DE 2415086 10/1975
(Continued)

OTHER PUBLICATIONS

Eberhard Waffenschnidt et al "Design Method and Material Technologies for Passives in Printed Circuit Board Embedded Circuits", IEEE Transactions on Power Electronics, Piscataway, NJ, US, vol. 20, No. 3, May 3, 2005, pp. 576-584, XP011131672.

*Primary Examiner* — Bao Q Truong

(57) ABSTRACT

The present invention relates to a lighting system comprising a base part (12) with at least one primary coil (18), and at least one light module (13, 14) with a secondary coil (26) adapted to inductively interact with the primary coil (18). The lighting system is characterized in that said base part (12) comprises a substrate (50) carrying said primary coil (18), the winding of which lying in one plane and forming a flat coupling area (16); the winding of the second coil (26) lies in one plane; and said light module (13, 14) comprises at least one light element (20) and a flat bottom surface, so that the light module (13, 14) is placeable with its flat surface on the flat coupling area (16).

17 Claims, 7 Drawing Sheets

U.S. PATENT DOCUMENTS

| | | | |
|---|---|---|---|
| 5,845,987 A * | 12/1998 | Painter | 362/206 |
| 6,008,622 A | 12/1999 | Nakawatase | |
| 6,430,064 B1 | 8/2002 | Tsuchimoto et al. | |
| 6,682,055 B1 | 1/2004 | Tomlinson et al. | |
| 6,776,398 B1 | 8/2004 | Tsai | |
| 2001/0012208 A1 | 8/2001 | Boys | |
| 2002/0008973 A1 | 1/2002 | Boys et al. | |
| 2004/0000974 A1 | 1/2004 | Odenaal et al. | |
| 2005/0122058 A1 | 6/2005 | Baarman et al. | |

FOREIGN PATENT DOCUMENTS

| | | |
|---|---|---|
| EP | 1319889 A1 | 6/2003 |
| EP | 1367677 A2 | 12/2003 |
| FR | 2695285 | 3/1994 |
| JP | 2002188325 A | 7/2002 |
| WO | 0116995 A1 | 3/2001 |
| WO | 2004073283 A2 | 8/2004 |
| WO | 2006038795 A2 | 4/2006 |

* cited by examiner

LIGHTING SYSTEM

This application is a national stage application under 35 U.S.C. §371 of International Application No. PCT/IB2007/051913 filed on May 21, 2007, and published in the English language on Jan. 31, 2008, as International Publication No. WO/2008/012702, which claims priority to European Application No. 06117675.6, filed on Jul. 21, 2006, incorporated herein by reference.

FIELD OF THE INVENTION

The present invention relates to a lighting system comprising a base part with at least one primary coil, and at least one light module with a secondary coil adapted to inductively interact with the primary coil.

BACKGROUND OF THE INVENTION

In the art, for example from document EP 1 319 889 A1, it is known to energize a light-emitting diode inductively by using a primary coil and a secondary coil connected with the LEDs.

Generally, wireless powering and/or charging systems are frequently used in many applications. They allow powering of devices or charging of batteries (or capacitors) without electrical contacts. This is especially advantageous in environments where no electrical plugs and connectors are allowed, such as bathrooms and special rooms in hospitals, or where electrical plugs and connectors are not practical.

A wireless powering system is realized with the help of inductive coupling. Its power can be drawn from e.g. a public grid or from a battery. It is preferably realized as a resonant half-bridge or full-bridge converter with soft-switching behavior. A transformer enables the inductive coupling. The current through the primary coil of the transformer generates an alternating magnetic field. This alternating magnetic field generates a voltage in the secondary coil. The rectified voltage is then directly fed to a light source, like a light-emitting diode. Beside the aforementioned light-emitting diodes, so-called organic light-emitting diodes (OLED) are of growing interest and it is assumed that OLEDs will be a high potential future light source. This is due to their high efficiency and the cost-effective manufacturing. One of the most important advantages of OLEDs is their form factor, since they are thin and flat.

In many applications where LEDs or OLEDs can be used, the LED or OLED tiles have to be freely placeable and scaleable. Examples of such applications are general lighting systems, design lamps and decorative lights.

As a problem, devices with LEDs or OLEDs need to be powered or their batteries need to be recharged. In many environments, a conventional solution with electric contacts is subjected to pollution or to humidity. Additionally, open electric contacts cause short-circuit risks or shock danger. Thus, a wireless inductive charging method is preferred. In case of OLEDs the form factor (thin and flat) is important to designers and architects. However, standard drivers are bulky.

SUMMARY OF THE INVENTION

In view of the above, it is an object of the present invention to provide a lighting system, preferably a lighting system with LEDs or OLEDs, which releases the design restraints so that the designer has more possibilities to design and employ lighting systems. Further, the costs for manufacturing the lighting system should be reduced.

This and other objects of the present invention are solved by the aforementioned lighting system, wherein said base part comprises a substrate carrying said primary coil, the winding of which lying in one plane and forming a flat coupling area, the winding of said secondary coil lies in one plane, and said light module comprises at least one light element and a flat bottom surface, so that the light module is placeable with its flat surface on the flat coupling area. Preferably said light module comprises a converter unit, preferably a rectifier circuit coupled to the secondary coil. The light element can be a LED or an OLED or an array of LEDs or OLEDs.

With other words, the present invention provides a base part with a substrate, which carries a flat primary coil, the winding turns of which extending in a plane parallel to the substrate. In former solutions, the primary coil of the transformer has a cylindrical shape with its winding extending three-dimensionally.

The advantage of the primary coil according to the present invention is that the field of applications may be broadened.

Moreover, the light module may be designed with a smaller form factor due to the fact that the winding of the secondary coil also lies in one plane parallel to a flat surface of the light module.

It is now possible to design very small light modules without any electrical contacts. The light module has only to be placed on the flat coupling area of the base part and may be powered wirelessly by using the electromagnetic field between the first and the second coil.

The primary and secondary coils may be provided as printed circuit lines (made of an electrically conductive material, like copper, silver, etc.) which allows a very cost-effective manufacturing.

A further advantage of the present invention is that the base part with its substrate and the electronic components thereon may be formed very compactly allowing to integrate the base part in quite a lot of objects, for example a textile, a wallpaper, a mirror, a curtain or a floor covering, which are generally very thin objects.

In general, the inventive solution enables to design a lighting system with less restrictions compared to former solutions.

In a preferred embodiment the base part comprises a plurality of primary coils, preferably arranged as an array, defining a plurality of preferably similar coupling areas.

With other words, the base part comprises a plurality of coupling areas which are arranged like a chessboard as one example. Of course other forms, whether rectangular or circular, are also conceivable. The light module with its flat surface may be put on any of the plurality of similar coupling areas so that the designer or user of the lighting system has a variety of possibilities to arrange one or more light modules.

In a further preferred embodiment, said base part and/or said light module comprise a soft-magnetic plate.

This measure has the advantage that the magnetic field of the coils is shielded from the remaining circuits and the magnetic flux density in the winding of the coils is improved to gain a higher output voltage and a better coupling. The soft-magnetic material can be a ferrite plate, a µ-metal, etc., however, preferably it consists of a material that can be laminated to a printed circuit board, e.g. a plastic ferrite compound or structured high permeable metal foil.

In a further preferred embodiment, the base part comprises an AC power supply preferably having a fundamental frequency greater than 100 KHz. More preferably, said AC power supply comprises a DC source and a DC-to-AC converter to generate the AC voltage.

These measures have been proven as advantageous in terms of efficiency. Particularly, the passive components may be dimensioned smaller.

In a further preferred embodiment, said primary coil of said base part and/or said secondary coil of said light module are realized in emPIC technology (embedded passive integrated circuit). More preferably, any or all passive components, preferably inductors and transformers, of the base part and the light module are realized in emPIC technology.

This technology allows to realize very thin and cost-effective printed circuit lines forming the winding of the primary and secondary coil, respectively. The emPIC technology is e.g. described in patent applications EP 05 109 219, EP 05 106 924, EP 03 102 693, EP 03 102 694, EP 03 102 648 or EP 03 101 991 as to quote just a few. These applications are incorporated by reference herewith.

In a further preferred embodiment, said base part comprises a detector unit for detecting a light module placed in said coupling area and a switch adapted to power the primary coil assigned to said coupling area in response to the detection of a light module.

This measure has the advantage that energy may be saved since only those primary coils are energized which have a counterpart in form of the secondary coil of a light module.

In a preferred embodiment, said base part comprises positioning elements, preferably mechanical positioning elements, for positioning said at least one light module in a coupling area.

This measure has the advantage that the light module may be placed on the coupling area in a predefined position so that the inductive coupling between the primary coil and the secondary coil is at the optimum. Further, the positioning element holds the light module at its place. Preferably, the positioning element is provided as a mechanical positioning element, like a snap-in lock. Other positioning elements, however, are also possible, for example attracting magnets provided at the base part and the light module.

In a preferred embodiment, the base part and/or said light module comprise resonant capacitors and a control circuit. More preferably, said light module comprises an energy storage element, preferably a rechargeable battery or a super capacitor. It is further preferred that the light module comprises a converter unit adapted to provide a controlled current and/or voltage to the at least one light, preferably an OLED element. The converter unit comprises an AC-to-DC single stage circuit or an AC-to-DC and DC-to-DC dual stage circuit. Of course other converter topologies are also conceivable, but the afore-mentioned topology has been proven as advantageous.

It is also preferred that the DC-to-AC converter of the base part, the primary and secondary coils and the converter unit of the light module are realized as a resonant converter.

The above-mentioned measures have been proven advantageous in practice.

In a further preferred embodiment, said substrate is either a semiconductor substrate, a glass substrate, a textile substrate, a plastic substrate, a wallpaper, a mirror, a curtain or a floor covering. These are preferred substrates, however, other substrates may also be employed.

In a preferred embodiment, said primary coil and/or said secondary coil are made of ITO (indium tin oxide), so that their winding turns are transparent.

This measure has the advantage that the primary coil and/or the secondary coil can be formed on a transparent substrate, like glass, etc. without negatively affecting the transparency of the substrate. In other words, the primary/secondary coil formed on the transparent substrate cannot be seen by the user.

In a preferred embodiment, said base part and said light module each comprise a controller unit adapted to wirelessly transmit and receive control signals via said primary and secondary coils.

This means in other words that the primary and secondary coils are not only used for transmitting power to energize the light elements but also to transmit control information between the base part and the light module. Control signals may for example comprise information which of the light elements of the light module should be switched on and off. Said control signals may further comprise e.g. information about color, agent compensation etc. The control signal may be modulated on the AC voltage supplied to the primary coil.

The inventive lighting system may be employed for design lamps, decorative lights, for games, puzzles, candle ("tea light") replacements and many other applications.

In a preferred embodiment, said winding of said base part and/or said light module comprises at least two winding parts, wherein each winding part has winding turns lying on a layer of a multi-layer circuit board.

With other words, the winding with its winding turns is divided in multiple parts. Each part has winding turns which are formed on a layer of a multi-layer circuit board. Hence the winding turns of the winding are provided on parallel layers of a multi-layer circuit board, wherein the winding turns of adjacent layers are electrically coupled with each other, e.g. by vias. In the context of the present application, the expression "plane" shall not be understood as a mathematically defined plane, but as a spatial (three-dimensional) plane defined by the circuit board or substrate on which the winding is provided. Hence, all winding parts according to this embodiment are still lying in a plane, namely the plane of the circuit board.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

In an embodiment the light element 20 comprises at least one OLED.

In another embodiment the light module 12 is arranged in a post 91. The post 91 comprising the light module 14 is part of an arrangement 9 of several posts 91 connected via post belts 92 to be placed on a ground floor 1 comprising an arrangement of base parts 12. In a preferred embodiment, the posts 91 are connected electrically via the post belts 92.

In another embodiment the light module 14 within the post 91 further comprises a rechargeable battery to be charged by the base part 12.

In an alternative embodiment, the light module 14 further comprises at least one switch for switching on/off the light element 20, preferably via remote control.

An embodiment of the invention is shown in the drawings and will be explained in more detail in the description below with reference to same. In the drawings:

DETAILED DESCRIPTION OF EMBODIMENTS

Figure 1:
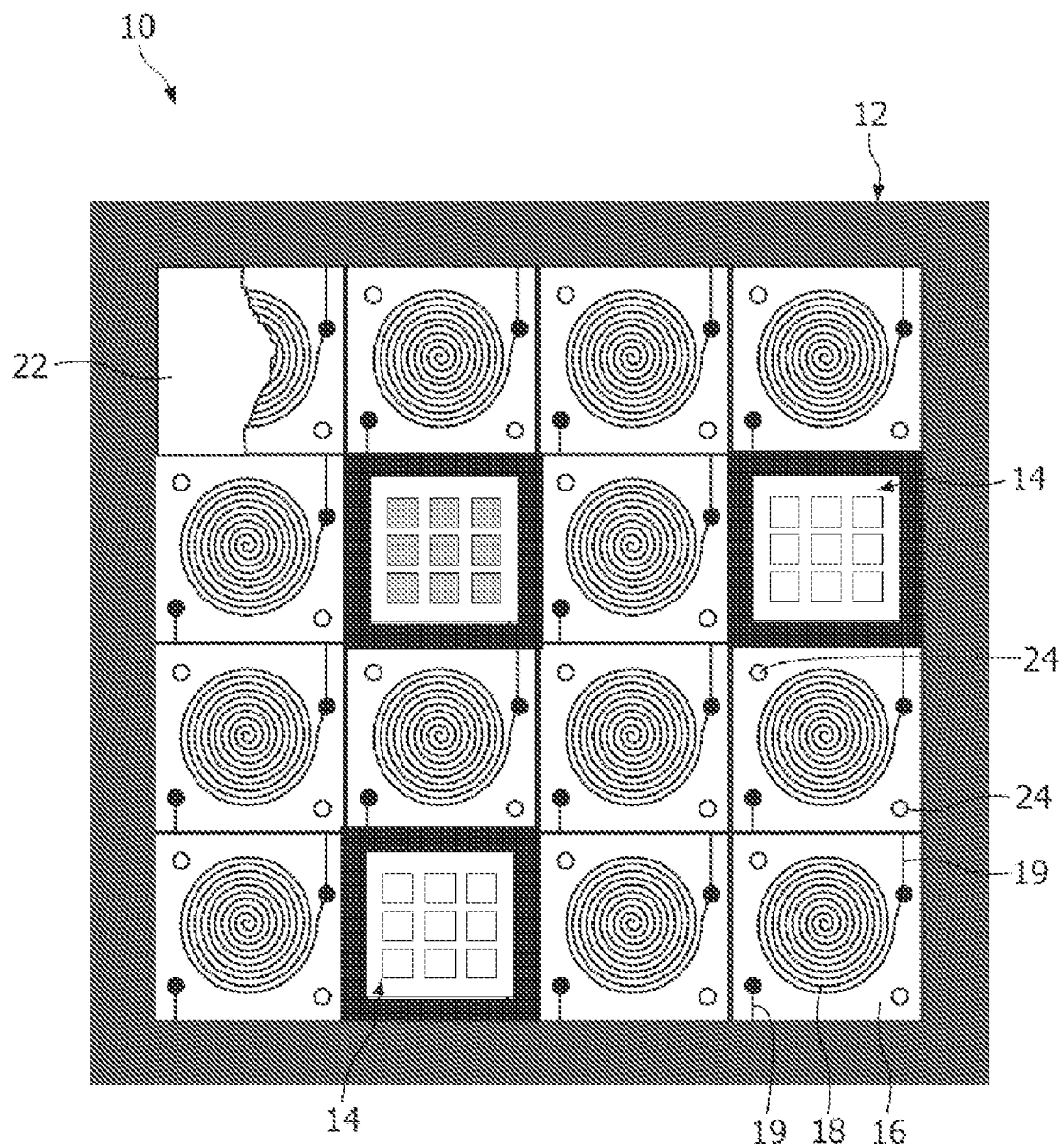
FIG. 1 shows a schematic plan view of a lighting system according to the present invention.
Figure 1:
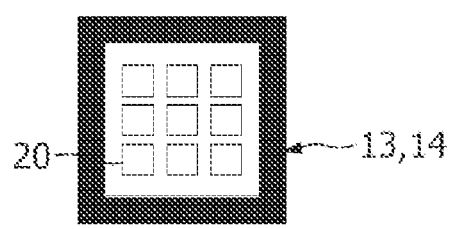

In FIG. 1 an embodiment of a lighting system is schematically shown and indicated with reference number 10. It is to be noted that the schematic diagram of the lighting system 10 is just for illustration purposes as to describe those technical features necessary for understanding the invention.

The lighting system 10 substantially consists of two main parts, namely a base part 12 and at least one light module 13. In the present embodiment, the light modules are provided as organic light-emitting diode modules 14 (in the following OLED module). Organic light-emitting diodes are well-known in the art and gain more and more interest due to their reduced power requirements compared to for example LCDs, their form factor, their flexibility, and the possibility to provide nearly all colours. In other embodiments, the light modules 14 may be LED modules.

Figure 5:
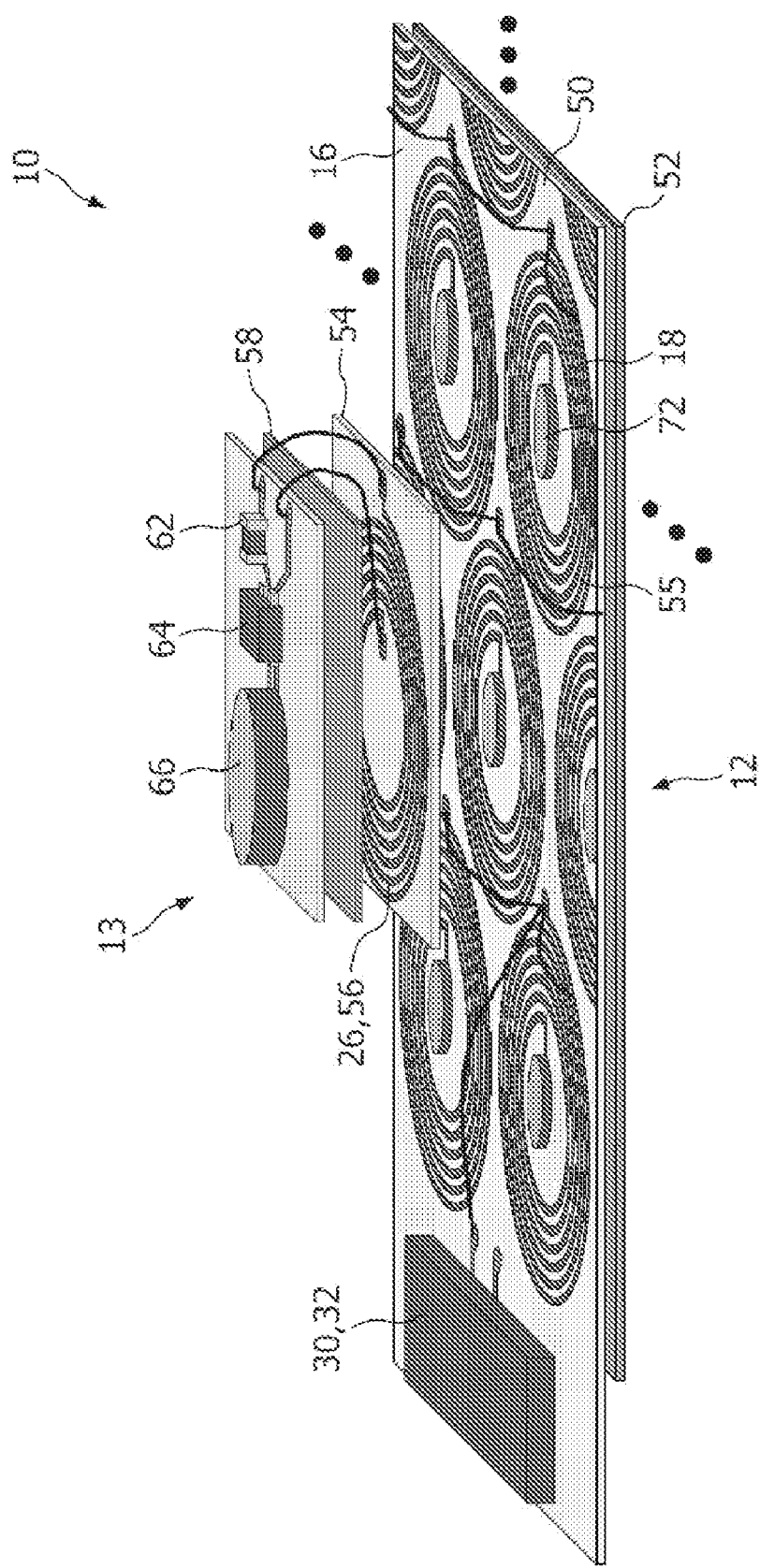
FIG. 5 is a schematic perspective view of a lighting system.

In the present embodiment, the base part 12 comprises a rectangularly shaped frame for holding a printed circuit board 50 (FIG. 5). On the printed circuit board 50, a plurality of coupling areas 16 is provided. In the example shown in FIG. 1, an array of 4×4 coupling areas 16 is defined, resulting in sixteen coupling areas in total. However, it is to be noted that this is just an example and the number of coupling areas can differ to less or more areas depending on the application.

Each coupling area 16 at least comprises a primary coil 18 which is supplied with an AC-voltage via lines 19. Each primary coil consists of a helically arranged circuit line defining a plurality of winding turns of a winding. The winding turns of the primary coil 18 therefore extend in one plane parallel to the printed circuit board 50. Of course the circuit lines may be arranged in different forms, e.g. helically, rectangularly, etc. Further, it is to be noted that the primary coil may consist of multiple coil parts or components, each component comprising circuit lines (forming winding turns) arranged in one layer of a multiple layer printed circuit board. With other words, the primary coil comprises a plurality of winding parts, each winding part with its winding turns lying on a layer of a multi-layer circuit board.

Each coupling area 16 further comprises at least one positioning element 24 which is adapted to engage with a corresponding positioning element provided on the light module 13. The positioning elements 24 serve to exactly position a light module on a coupling area 16. The positioning element 24 itself may be provided as a whole in the printed circuit board for receiving a snap-in pin. Of course, other possibilities may also be considered, for example magnetic elements on the printed circuit board 50 and the light module 13, or any other mechanical positioning solution.

Each light module 13 comprises a frame adapted to the field size of the coupling area 16. The frame also supports a printed circuit board 54 (FIG. 5) on which electrical elements are provided. Further, the light module 13 comprises at least one light element, for example a LED or OLED element 20. In the present embodiment, a plurality of LED or OLED elements 20 are provided and arranged in a 3×3 matrix. Hence, the present light module 13 comprises nine LED or OLED elements 20 in total. However, it is also to be noted that this number is just an example and the light module 13 may of course comprise just one LED or OLED element or more than the nine LED or OLED elements shown.

Each light module 13 further comprises a secondary coil 26 (FIG. 5) which is preferably but not necessarily structured like the primary coil 18. Particularly, the secondary coil 26 lies in one plane parallel to the printed circuit board 54 of the light module 13. Of course, the secondary coil 26 may also be provided on a multi-layer printed circuit board as described above with reference to the primary coil 18. In particular the winding of the secondary coil may also be divided in at least two winding parts, each winding part with its plurality of winding turns lying in a layer of a multi-layer circuit board. Hence, the winding parts with its winding turns are provided parallel to each other but still in the plane of the circuit board.

The secondary coil 26 serves to interact inductively with the primary coil 18 in order to transmit power from the base part 12 to the light module 13 wirelessly.

In order to wirelessly transmit power, the light module 13 has to be placed on a coupling area 16. The primary coil 18 and the secondary coil 26 must lie directly adjacent to each other so that the electric magnetic fields generated by an AC energized primary coil induce a current in the secondary coil. This current is then used to energize the respective LED or OLED elements 20 of the light module 13 and the LED or OLED module 14, respectively.

It is apparent from FIG. 1 that a light module 13 may be placed on each of the plurality of coupling areas 16. Further, the base part 12 may receive more than one light module 13. For example, it would be possible to place a light module 13 on each of the sixteen coupling areas 16.

In FIG. 1, a cover plate 22 is partially shown and is used to cover one coupling area 16.

Figure 2:
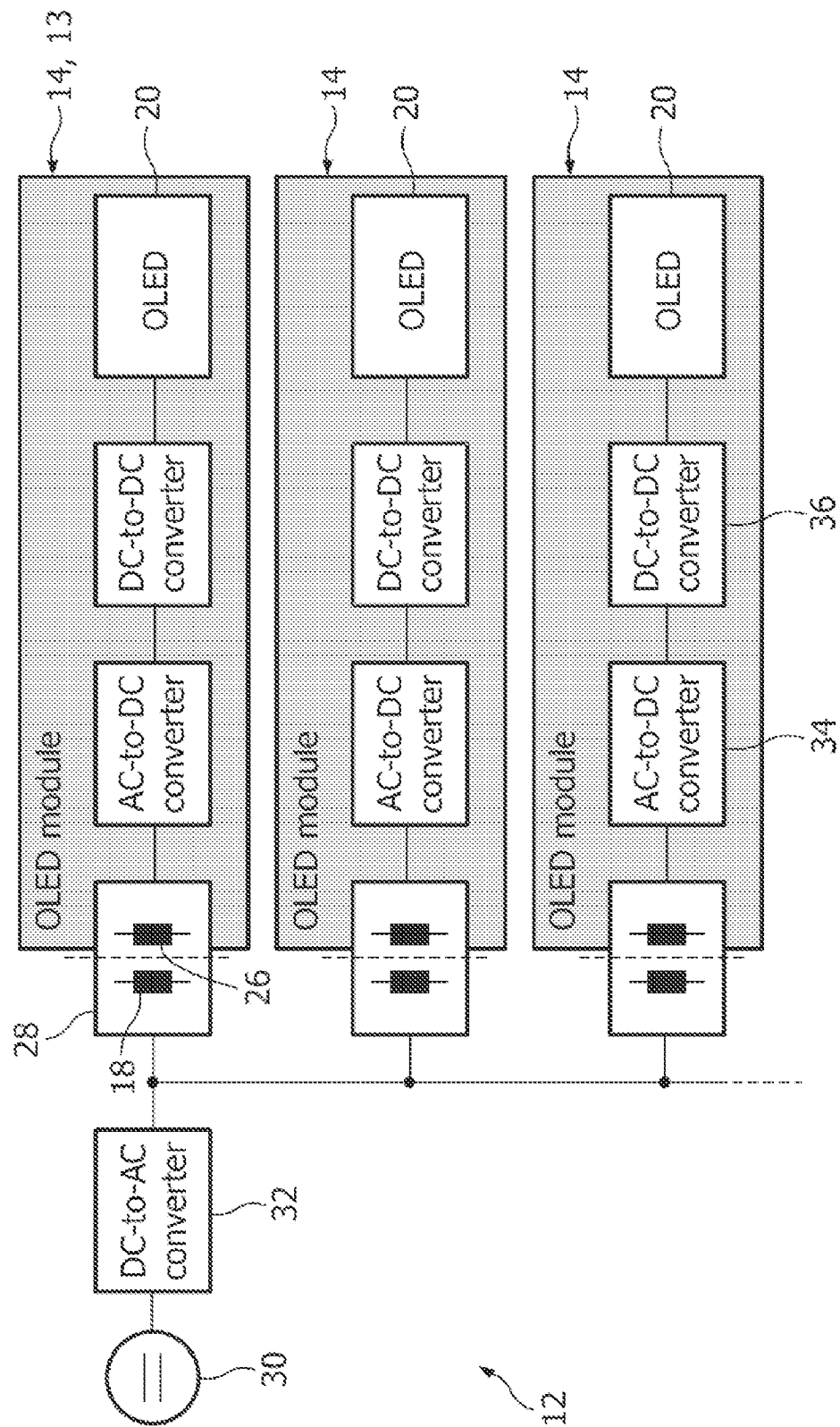
FIG. 2 is a block diagram of the lighting system according to the present invention.

Referring to FIG. 2, the electric structure of the lighting system 10 is schematically shown and will be explained below.

The base part 12 comprises, as already mentioned above, at least one primary coil 18. The primary coil 18 is part of a transformer 28, the secondary coil 26 of a light module 13 also belonging to transformer 28.

The primary coil 18 is coupled with a DC-to-AC converter 32 which is powered by a DC power supply 30. The DC-to-AC converter is adapted to convert the DC voltage into an AC voltage having a frequency of about 100 KHz or more.

Each light module 13 comprises the secondary coil 26 which is coupled to an AC-to-DC converter 34 which in turn is coupled with an DC-to-DC converter 36. The output of the DC-to-DC converter 36 is then coupled with the at least one LED or OLED element 20.

The AC-to-DC converter 34 rectifies the AC voltage supplied by the secondary coil 26 to a non-controlled DC voltage. The following DC-to-DC converter 36 then converts this uncontrolled voltage to a controlled current necessary for powering the LED or OLED element(s) 20.

Figure 4:
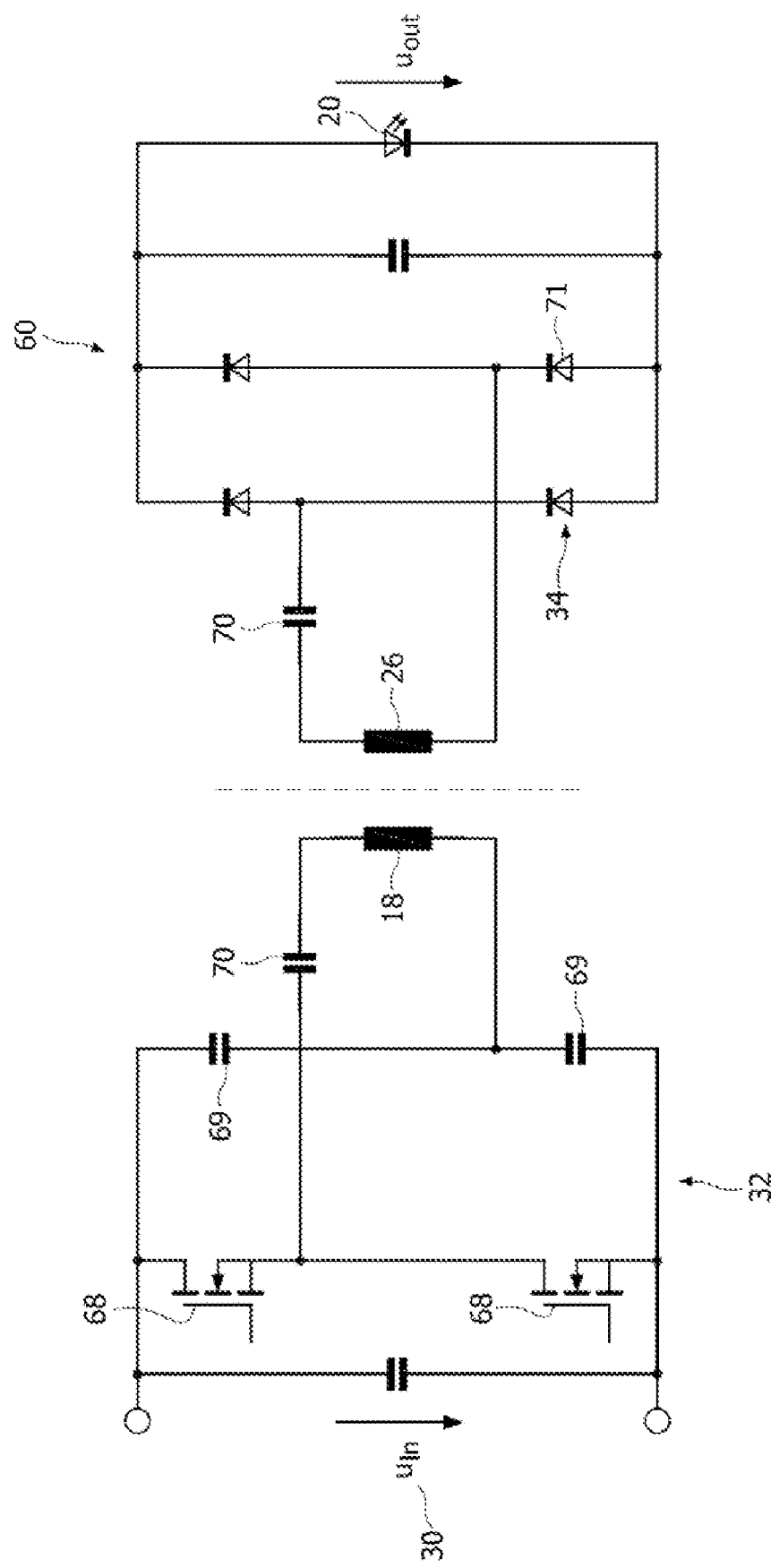
FIG. 4 is a block diagram of a resonant converter with inductive coupling between primary and secondary side.

As mentioned above, the wireless power transfer from the DC power supply 30 to a light module 13 is carried out by an inductive coupling between the primary coil 18 and the secondary coil 26. In a preferred embodiment, this inductive coupling, i.e. the DC-to-AC converter 32, the transformer 28 and the AC-to-DC converter 34, is realized as a resonant converter 60, an example of which is shown in FIG. 4. The DC-to-AC converter 32 of the resonant converter comprises two switching elements 68 provided as field-effect transistors and connected in series. Parallel to the transistors 68, two capacitors 69 are arranged in series. The coil 18 is coupled with the centre taps of the transistor series connection and the capacitor series connection. In one supply line of the primary coil 18, a further capacitor 70 is provided.

The AC-to-DC converter 34 of a light module 13 comprises a bridge rectifier 71 which provides a non-controlled DC voltage. In one supply line between the secondary coil 26 and the bridge rectifier 71, a capacitor 70 is provided.

Figure 3:
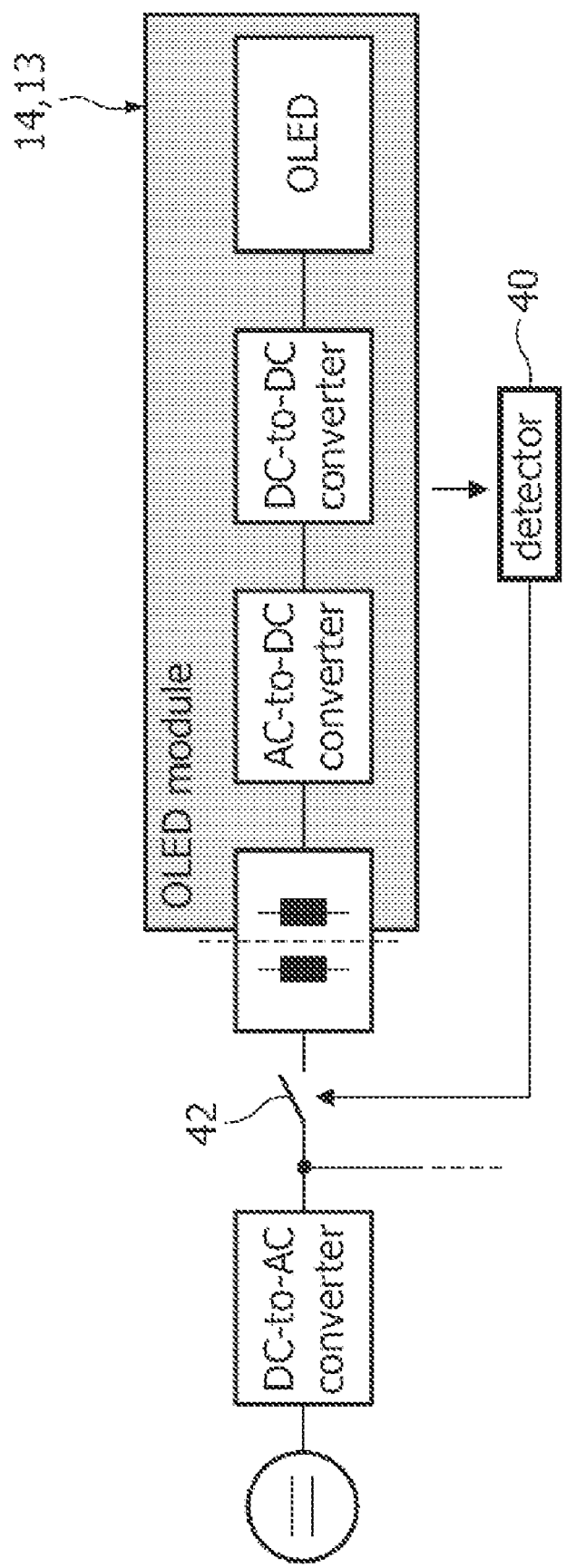
FIG. 3 is a block diagram of a lighting system with a detector for detecting a light module.

In the lighting system shown in FIG. 1, each of the plurality of primary coils 18 is powered by an assigned DC-to-AC converter 32 regardless whether a light module 13 is placed on the respective coupling area 16 or not. In order to save energy, in a preferred embodiment, each of the plurality of primary coils 18 may be switched on and off selectively. This may be achieved by providing a switch 42 between the DC-to-AC converter 32 and the primary coil 18 of a coupling area 16. This switch 42 may be operated manually by the user or in a preferred embodiment automatically depending whether a light module 13 is placed on a coupling area 16 or not. A respective electric block diagram of such a solution is shown in FIG. 3. In addition to the circuitry shown in FIG. 2, a detector is provided for each coupling area 16. The detector is adapted to detect a light module 13 on a coupling area 16. If a light module 13 is present on the coupling area 16, the switch 42 between the DC-to-AC converter and the primary coil 18 is switched on. Otherwise, the detector 40 keeps the switch 42 in the switched-off state.

In FIG. 5, a preferred implementation of the lighting system 10 is schematically shown. The base part 12 comprises a substrate 50, here a printed circuit board carrying the plurality of primary coils 18. The primary coils 18 are provided as helically extending printed circuit board conductors. Hence, the coils 18 with their windings lie in a plane parallel to the substrate 50. In other words, the coils 18 are designed as two-dimensional elements which are very flat.

In the centre of each helical coil 18, a detector and switch circuit 72 are disposed. The detector and switch circuit 72 is adapted to recognize a light module 13 placed thereon. In the art, different possibilities to detect a light module are known. The detection may be performed mechanically, magnetically, inductively and/or optically.

Further, the substrate 50 also carries the DC power supply 30 and the DC-to-AC converter 32 supplying all coils 18 with the required AC voltage. Beneath the substrate 50 and parallel thereto, a soft-magnetic plate 52 is disposed. The soft-magnetic plate serves to improve the inductive coupling between the primary and secondary coil.

The light module 13 also comprises a substrate 54 in form of a printed circuit board on which secondary coil 26 is provided. In this preferred embodiment, the secondary coil 26 is designed as a two-dimensional flat secondary coil 56, the helically extending windings of which lying in a plane parallel to the substrate 54. The number of winding turns of the secondary coil 56 is selected dependent on the application purpose, preferably the level of the required voltage.

Above the substrate 54 a soft-magnetic plate 58 is disposed serving the same purpose as the soft-magnetic plate 52 mentioned above.

The light module 13 further comprises a circuitry arranged on a printed circuit board and comprising a resonance capacitor 62, a rectifier 64 and a rechargeable battery 66.

The battery 66 supplies one or more LED or OLED elements 20 which are not shown in FIG. 5. The circuitry may additionally comprise a control device for controlling the switch of the LED or OLED elements 20 of a light module.

It is preferred to realize the primary and secondary coils 18, 26 as well as the circuitry of the light module 13 in the so-called emPIC (embedded passive IC) technology to keep the overall system thin.

Figure 6:
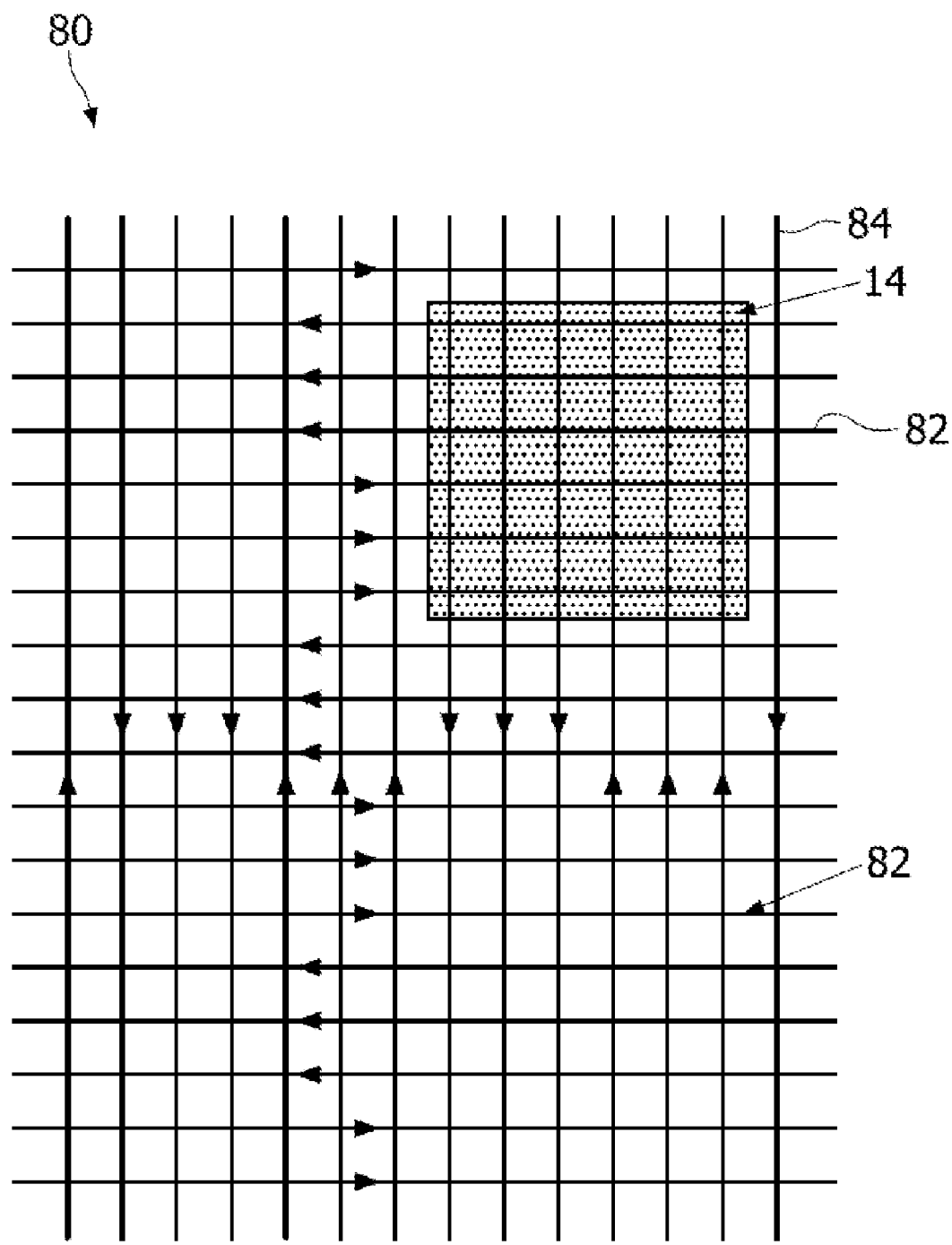
FIG. 6 is a schematic plan view of a base part with the primary coils according to a second embodiment.

In FIG. 6, a further embodiment of a lighting system 10 is shown and indicated with reference number 80. The only difference to the lighting system described before is the structure of the primary coils 18. In this embodiment, the primary coils are formed by first conductor lines 82 and second conductor lines 84. The first conductor lines 82 as well as the second conductor lines 84 extend parallel to each other, and the first conductor lines 82 extend orthogonally to the second conductor lines 84. In order to generate a magnetic field necessary for an inductive coupling in the secondary coil, the direction of the current alternates each three adjacent conductor lines, as indicated by arrows in FIG. 6. The same applies also to the second conductor lines 84. An LED or OLED module 14 is placed on the conductor lines 82, 84 as shown in FIG. 6, and the magnetic field generated by a current in lines 82, 84 induces a voltage in the secondary coil 26 of the LED or OLED module 14.

As mentioned above, the light module 13 may comprise a plurality of LED or OLED elements 20. In order to selectively switch each LED or OLED element 20, a control signal is transmitted from the base part 12 to the light module 13. The transmission of the control signal may also be realized wirelessly. For example, the control signal may be modulated on the AC voltage provided by the DC-to-AC converter 32 of the base part 12.

This modulated control signal may be received by a respective receiver connected to the secondary coil 26 of the light module 13. However, other possibilities to transmit the control signals are also possible. Examples of wireless transmission of signals are RFID, nearfield communication (NFC), capacitive coupling, inductive coupling or light coupling.

Figure 7:
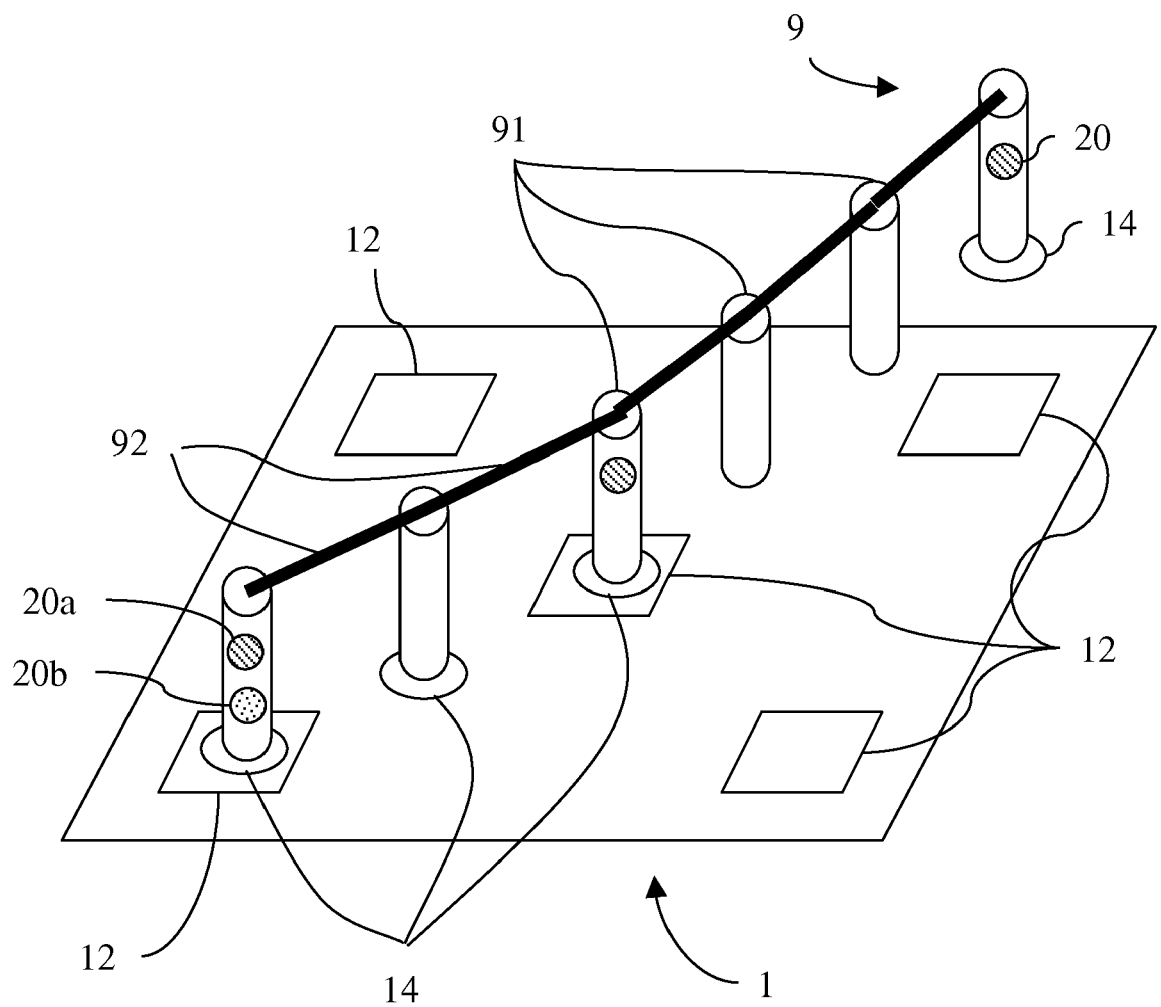
FIG. 7 is a schematic view of the lighting system used to power an arrangement of connected posts.

In another embodiment as shown in FIG. 7, the lighting system 10 is used to power light elements (20) as part of an arrangement 9 of several posts 91 (belt post system) as used in many public areas as crowd control elements e.g. to organize queuing, to indicate prohibit areas, to structure large areas in airports, stadiums, train station etc. In a typical application, belt posts 91 are freely placed on the ground 1 to enable a more-or-less free re-arrangement. Here, the floor covering of the ground 1 comprises at least one base part 12 while at least one post 91 of the belt post system 9 comprises at least one light module 14 with a secondary coil 26. The guiding functionality of the belt post system 9 is supported by the lighting system 10 providing additional visible information via e.g. green, red or yellow emitting light elements (20). Such a lighting system 10 can also be used to illuminate the area around the post 91, especially the ground floor 1 around the post 91, e.g. in dark rooms such as cinemas or theatres.

To enable a coupling between base part 12 and light module 14, the post foot comprises a wide ground plate with the secondary coil 26 of the light module 12 covering a substantial area of the ground floor 1. In order to improve the variability of the belt post system 9, the ground floor 1 may comprise an array of base parts 12. Here, at least one, but also several or all posts 91 comprise a secondary coil 26 in order to be coupled to a neighbored base part 12 within the ground floor 1.

In another embodiment, the posts 91 are electrically connected via the belt 92 made out of flexible ribbons comprising at least two wires may be woven in the ribbons or stitched onto it. Alternatively, tacks may be printed on the ribbon using electrically conducting paste. Each ribbon comprises connection means on its end to connect the ribbon to the next post.

Here, the posts 91 can share their electrical energy. It is possible to place posts 91 outside the area of the ground floor 1, which comprises base parts 12 of the lighting system 10.

In another embodiment, one or more posts 91 are equipped additionally with a rechargeable battery, which can be charged by any coupled base part 12. Here, the non-connected post 91 can be used on a ground floor area without base parts 12 for a certain amount of time.

The light elements 20 may also be arranged onto the ribbons in addition to an arrangement on the posts 91 or alternatively to it. The light elements 20 may be arranged as or connected to a running light, e.g. indicating a direction for the movement of the cue. The speed of the running light may be an indicator of the urgency to move.

The light elements 20 may be arranged as displays e.g. indication direction signs like arrows etc or providing information for waiting people.

The light modules 14 may comprise additional switches integrated within the posts to switched the light elements 20 on/off via remote control by an operator. As an example, the post 91 comprise red and green light elements 20a and 20b, where the red and green elements 20a and 20b can be switched individually to indicate "go" as green light and "stop" as red light or blinking light may indicate danger.

An alternative power supply via batteries to maintain the variability of belt post systems together with illumination purposes via light modules is not possible due to the required periodical exchange of the batteries in hundreds and more post every few days.

In view of the above, it is to be noted that a very flexible and flat lighting system 10 may be provided offering a high flexibility to arrange light modules 13. Further, the flat coils used in the light modules 13 keep the form factor of OLED elements so that the dimensions of these modules can be reduced particularly in view of their height.

The wireless power transfer from the base part to the respective light modules and the flat form of the light modules allow the usage of the inventive lighting system in a wide field of applications. For example, the lighting system according to the present invention may be used for design lamps, decorative lights, but also for games, puzzles, candle ("tea light") replacements, etc. Moreover, the inventive lighting system may be used on wallpapers, curtains, mirrors or floor covering. If the conductor lines of the primary coils are provided in tin-doped indium oxide (ITO) technology, the inventive lighting system may also be used on windows because the ITO circuit lines are transparent.

The invention claimed is:

1. Lighting system comprising:
a base part comprising a substrate carrying at least one primary coil having a winding lying in a first plane and forming a substantially flat coupling area, and
at least one light module comprising a secondary coil adapted to inductively interact with the primary coil and having a winding lying in a second plane, said light module comprising at least one light element and having a flat bottom surface for placing said light module in the flat coupling area,
wherein said base part comprises a (i) detector unit for detecting a light module placed in said coupling area and (ii) a switch adapted to power the primary coil coupled too said coupling area in response to the detection of the light module.

2. The lighting system of claim 1, wherein said light module comprises a converter unit coupled to the secondary coil and to the light element.

3. The lighting system of claim 1, wherein said base part and/or said light module comprise a soft-magnetic plate.

4. The lighting system of claim 1, wherein said base part comprises an AC power supply having a fundamental frequency greater than 100 KHz.

5. The lighting system of claim 4, wherein said AC power supply comprises a DC source and a DC-to-AC converter to generate the AC voltage.

6. The lighting system of claim 1, wherein said base part comprises a plurality of mechanical positioning elements for positioning said at least one light module in the coupling area.

7. The lighting system of claim 1, wherein said light module comprises an energy storage element.

8. The lighting system of claim 1, wherein said base part and said light module each comprise a controller unit adapted to wirelessly transmit and receive control signals via said primary and secondary coils.

9. The lighting system of claim 1, wherein said winding of said base part and/or said light module comprise at least two winding parts, wherein each winding part has winding turns lying on a layer of a multi-layer circuit board.

10. The lighting system of claim 1, wherein the light element comprises at least one OLED.

11. The lighting system of claim 1, wherein the light module is arranged in a post.

12. The lighting system according to claim 11, wherein the post is part of an arrangement of several posts connected via post belts to be placed on a ground floor comprising an arrangement of base parts.

13. The lighting system according to claim 12, wherein the posts are connected electrically via the post belts.

14. The lighting system according to claim 11, wherein the light module further comprises a rechargeable battery to be charged by the base part.

15. The lighting system of claim 2, wherein said converter unit comprises a rectifier circuit.

16. The lighting system of claim 2, wherein said converter unit is adapted to provide a controlled current and/or voltage to the at least one light element, and comprises (i) an AC-to-DC converter and (ii) an DC-to-DC dual stage converter circuit or an AC-to-DC single stage converter circuit.

17. The lighting system of claim 1, wherein said windings of said primary coil and/or said secondary coil comprise indium tin oxide.

* * * * *